United States Patent [19]
Hartmann

[11] Patent Number: 5,560,562
[45] Date of Patent: Oct. 1, 1996

[54] FISHING REEL WITH A THREE SPEED PLANETARY DRIVE AND DRAG CONTROL

[76] Inventor: Dirck T. Hartmann, 4121 Morning Star Dr., Huntington Beach, Calif. 92649

[21] Appl. No.: 494,817

[22] Filed: Jun. 26, 1995

[51] Int. Cl.$^6$ .................. A01K 89/00; A01K 89/015
[52] U.S. Cl. ................ 242/255; 475/300; 192/111 B; 242/271; 242/303
[58] Field of Search .................... 242/255, 270, 242/271, 303; 475/300, 296; 192/56.1, 56.6, 22, 111 B, 70.25; 464/46; 188/196 M, 71.7

Primary Examiner—Daniel P. Stodola
Assistant Examiner—Emmanuel M. Marcelo

[57] ABSTRACT

The fishing reel features a three speed planetary drive in a gear housing on one side of the reel, and an improved mechanism for drag control in a clutch housing on the other side. The planetary drive uses an axially slidable high speed sun gear which is coupled by a transverse pin to a positioning rod in an axial hole in the reel axle. A compression spring forces the positioning rod to the outboard end of its travel where the reel provides a direct drive. Two conical grooves in the positioning rod are used in conjunction with a pair of steel balls and a spring loaded ball retainer, to trap the positioning rod in one or the other of two inner positions required for intermediate or high speed. The improved mechanism of drag control features a calibration disk; a drag lever with a spring loaded pin mounted near the end of the lever; and a strike ring engaged by the spring loaded pin with conical depressions in the strike ring indicating the lever positions for free spool or strike. A pair of pins fixed in the drag lever engage any diametrically opposed pair of holes in the calibration disk and indicate the current drag setting.

3 Claims, 3 Drawing Sheets

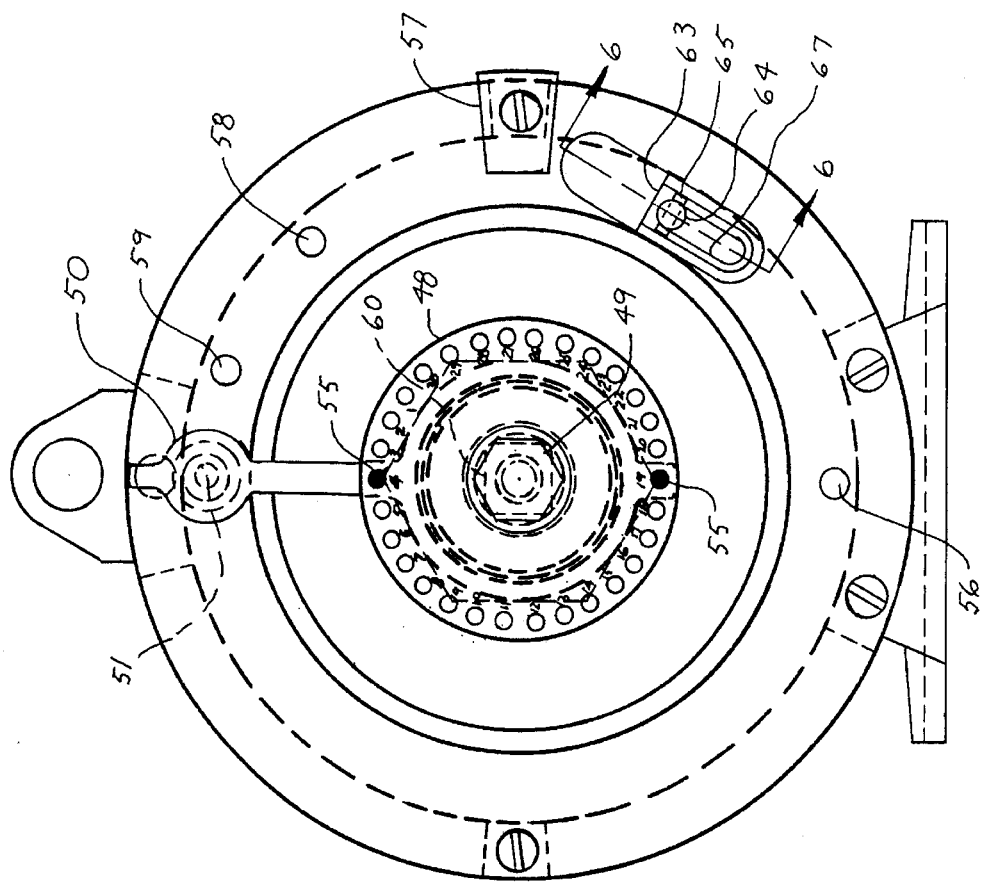
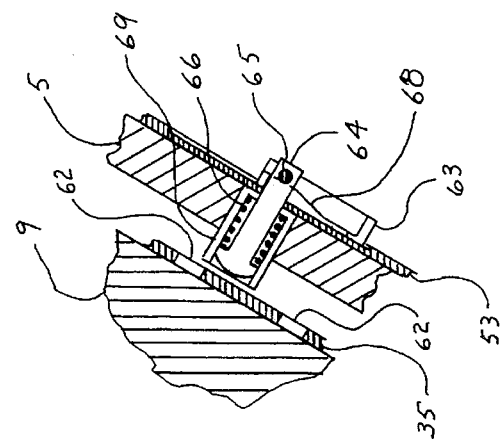
FIG 5
FIG 6

FISHING REEL WITH A THREE SPEED PLANETARY DRIVE AND DRAG CONTROL

BACKGROUND OF THE INVENTION

1. Field of the Invention

This invention relates generally to multiple speed drives for fishing reels and more particularly to drives requiring precise drag control for big game ocean fishing.

2. Description of the Prior Art

The most common multiple speed big game fishing reels use drive shafts offset from the axis of the spool. The reel crank and gears mounted on this offset shaft drive the pinion gears and spool in the opposite direction from the rotation of the crank so that the line winds onto the spool on the side away from the rod. With the present invention however, the spool turns in the same direction as the crank and the line winds on the spool on the side next to the rod. Torque from the drive gears is carried to the spool through a one way clutch which prevents the crank from being driven backwards, and through a friction clutch which limits the line tension to a load well below its breaking strength. Both clutches are located on the side of the reel opposite the crank. With conventional reels provisions for adjusting the torque required to slip the clutch are located on the crank side of the reel and require axial motion of the spool. These provisions comprise a lever actuated cam and a separate screw which controls the position of the cam. With this arrangement the position of the separate screw can be changed without the fishermans knowledge, so that he cannot be sure of the current drag setting without retesting with a spring scale. Also with the conventional gear arrangement the required shaft offset becomes excessive when high gear ratios are desired.

An object of the present invention is to provide a compact multiple speed alternative to the conventional reel drive, with a means for the fisherman to know the current drag setting by simply looking at the reel.

SUMMARY OF THE INVENTION

The fishing reel according to the present invention, incorporates a three speed planetary transmission inside 8 gear housing on one side of the reel, and a means for adjusting the maximum line tension in a clutch housing located on the opposite side of the reel. The planetary drive includes a ring gear rigidly fixed inside the gear housing; a planet gear carrier rotatably mounted in the gear housing including a cylindrical portion which extends out through a bearing in the housing and to which a crank assembly is rigidly fastened; two pairs of different size planet gears rotatably mounted in the planet gear carrier with each pair in constant mesh with the ring gear; and a sun gear in mesh with each pair of planet gears. The smaller, high speed sun gear, is slidably mounted on but torsionally fixed to an axle which extends through the reel on the spool centerline with one end supported in a bearing inside the cylindrical portion of the planet gear carrier, and the other end supported in a bearing in the clutch housing. The larger sun gear is rotatably mounted and axially captive in the planet gear carrier. An internal tooth form inside the bore of the larger sun gear and a matching integral internal tooth form in the planet gear carrier outboard of the larger sun gear, are arranged to mesh with the external teeth on the high speed sun gear when it is moved axially into their plane. Thus the high speed sun gear transfers torque from the crank to the axle in all three speeds.

A shift rod is located in an axial hole in the center of the axle with a compression spring between the end of the shift rod and the inboard end of the hole. The shift rod is coupled to the high speed sun gear by a pin located in a transverse hole through the inboard end of the shift rod, which passes out through slotted openings in the sides of the axle and into holes in a hub of the high speed gear. A pair of steel balls are located in diametrically opposed holes through the walls of the axle near its outboard end. A cylindrical ball retainer is slidably mounted on the axle over the steel balls. The inside diameter of the ball retainer is a close fit on the axle for a portion of its length at its inboard end, with a larger inside diameter for a portion of its length near its outboard end, with a conical transition section connecting the two diameters. A short separate length of the ball retainer engages the inner race of the axle bearing inside the planet gear carrier. A compression spring installed between the inboard and outboard lengths of bal.1 retainer forces the outboard length out toward the end of the axle where its travel is limited by a retainer ring installed in a groove in the axle. The shift rod has two conical grooves located so that when the outboard groove is in the plane of the steel balls, the high speed sun gear engages the inboard pair of planet gears; and when the inboard groove is in the plane of the steel balls the high speed sun gear engages the internal teeth on the low speed sun gear. When the outboard length of ball retainer is pushed inward so that the portion with the larger inside diameter is over the steel balls, the conical grooves in the shift rod force the steel balls out into the larger diameter portion of the ball retainer permitting the shift rod to move the high speed sun gear to the outboard end of its travel and into engagement with the internal teeth on the planet gear carrier. If the shift rod is pushed inward from its outboard position, as the inboard conical groove on the shift rod moves into the plane of the steel balls, the conical transition length of the ball retainer moves outboard and forces the balls into the conical groove in the shift rod trapping it in that position. If the ball retainer is held in its inboard position until the outboard conical groove in the shift rod is located in the plane of the steel balls and then released, the steel balls trap the shift rod in the high speed position.

Torque from the axle is transferred through a spline in the axle to a brake plate located inside the clutch housing and, through brake lining bonded to the brake plate, to a drag washer fastened to one end of the spool. The drag washer also contains equally spaced holes around its outer perimeter for engagement with a strike alarm. A pair of pins welded to the brake plate extend through holes in a clutch plate which is spring loaded against the brake plate by a pair of belleville springs located between the inner race of the bearing on the end of the axle and the clutch plate. Spring loaded dogs mounted on the ends of the pins welded to the brake plate, engage a ratchet ring fixed inside the clutch housing and prevent the axle from being driven backwards. The spool is mounted on a pair of bearings on the axle. The inner race of the bearing at the gear housing end of the spool is seated against a shoulder on the axle. The bearing at the other end of the spool is held seated against a shoulder in the spool by a compression spring located between the brake plate and the inner race of the spool bearing.

The outer race of the bearing on the end of the axle is seated inside a drag lever mount rigidly fastened to the clutch housing, with a drag adjustment screw, which is threaded inside the drag lever mount, engaging the outer race of the axle bearing. A pair of projections on a drive fitting engage a pair of axial grooves in the drag adjustment screw. The drive fitting is free to rotate inside the drag lever mount but is held axially captive by an internal shoulder on the drag lever mount, and a calibration disk which is clamped on a square section of the drive fitting outboard of the drag lever mount. A pair of pins press fit in a drag lever located on the drag lever mount inboard of the calibration disk, are arranged to engage any diametrically opposed pair of closely spaced holes around the perimeter of the disk. A compression spring located near the end of the drag lever forces the lever out against the calibration disk, and forces a positioning pin inward against a strike ring bolted to the clutch housing. When the drag lever is rotated clockwise the drag adjustment screw drives the axle bearing inward compressing the belleville springs and increasing the compressive force on the brake lining and consequently the drag. A single stop on the strike ring limits drag lever rotation in the clockwise direction, and a strike alarm limits rotation in a counter clockwise direction. Three conical depressions in the strike ring indicate drag lever positions for the factory set drag, 20% less than the factory set drag, and free spool, with the stop serving to indicate 20% more than the factory set drag.

At the time the reel is assembled, the drag lever is rotated to increase or decrease the drag until the desired level of drag is accurately measured. The drag lever is then forced inward disengaging the pair of pins from the calibration disk, and is rotated on the drag lever mount without disturbing the position of the calibration disk until the positioning pin is located nearest the the conical depression in the strike ring for the factory set drag, with the pins press fit in the drag lever directly under a pair of holes in the calibration disk, at which point the drag lever is allowed to move back out re-engaging the calibration disk. A permanent decal with a number opposite each hole in the calibration disk, with the numbers going from the lower to the higher in a counter clockwise direction so that the higher numbers correspond with higher drag, is bonded to the disk and the number for the factory set drag highlighted. A table of approximate drag as a function of selected hole in the calibration disk for a typical new reel can be included in the operating instructions as well as data for compensation for brake lining wear.

BRIEF DESCRIPTION OF THE DRAWINGS

FIG. 5 is a view of the clutch housing end of a fishing reel with an improved means of drag control according to the present invention; and FIG. 6 is a cross sectional view taken along the line 6—6 of FIG. 5.

DESCRIPTION OF THE PREFERRED EMBODIMENT

Figures 1, 2:
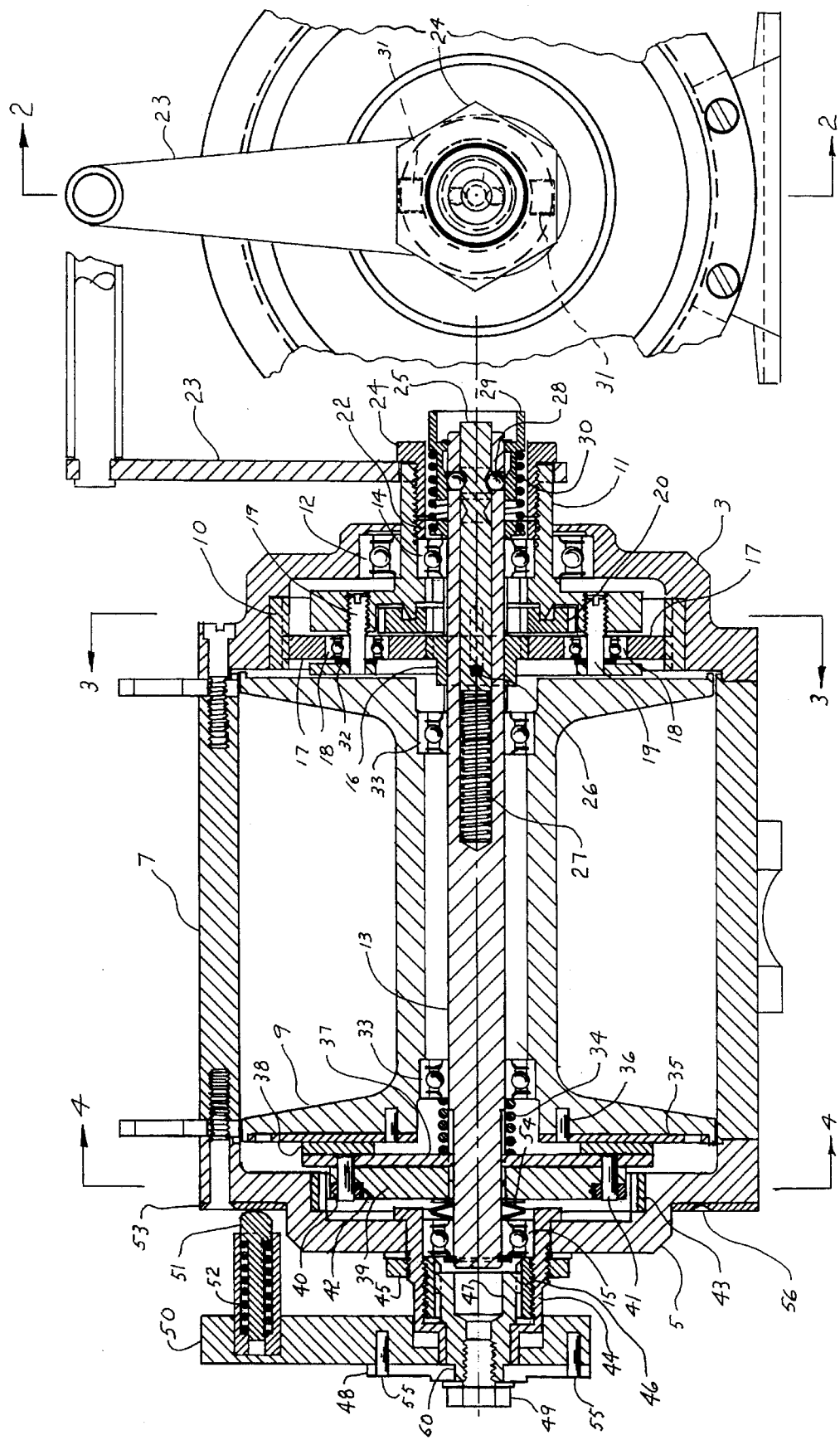
FIG. 1 is a partial view of the gear housing end of a fishing reel with a three speed planetary drive according to the present invention.
FIG. 2 is a cross sectional view taken along the line 2—2 of FIG. 1.

Referring to FIG. 2, a fishing reel in accordance with the present invention includes a gear housing 3, a clutch housing 5, a conventional frame 7, and a conventional spool 9. The three speed planetary drive includes a ring gear 10 press fit in the gear housing 3; a planet gear carrier 11, a cylindrical portion of which extends out through the inner race of a bearing 12 which is press fit in the gear housing 3; an axle 13 which extends through the inner race of a bearing 14 located inside the cylindrical extension of the planet gear carrier 11; a high speed sun gear 16 which is axially slidable on but torsional fixed to the axle 13; a pair of planet gears 17 in constant mesh with the ring gear 10 and in mesh with the sun gear 16 when the sun gear 16 is located in its inboard position as shown in FIG. 2; and a sun gear 20 which is rotationally mounted and axially captive in the planet gear carrier 11. The inner race of the bearing 14 is seated against a shoulder in the axle 13 provided by the end of a spline which transfers torque from the high speed sun gear 16 to the axle 13, and the outer race of the bearing 14 is clamped against a shoulder in the planet gear carrier 11 by a threaded collar 22. A bearing 18 is press fit inside each of the planet gears 17. The inner race of the bearing 18 and a washer 32 are clamped against the inboard wall of a pocket in the planet gear carrier 11 by a planet gear mounting pin 19 the outboard end of which is threaded into the planet gear carrier 11, centering the planet gear 17 in the pocket.

Figure 3:
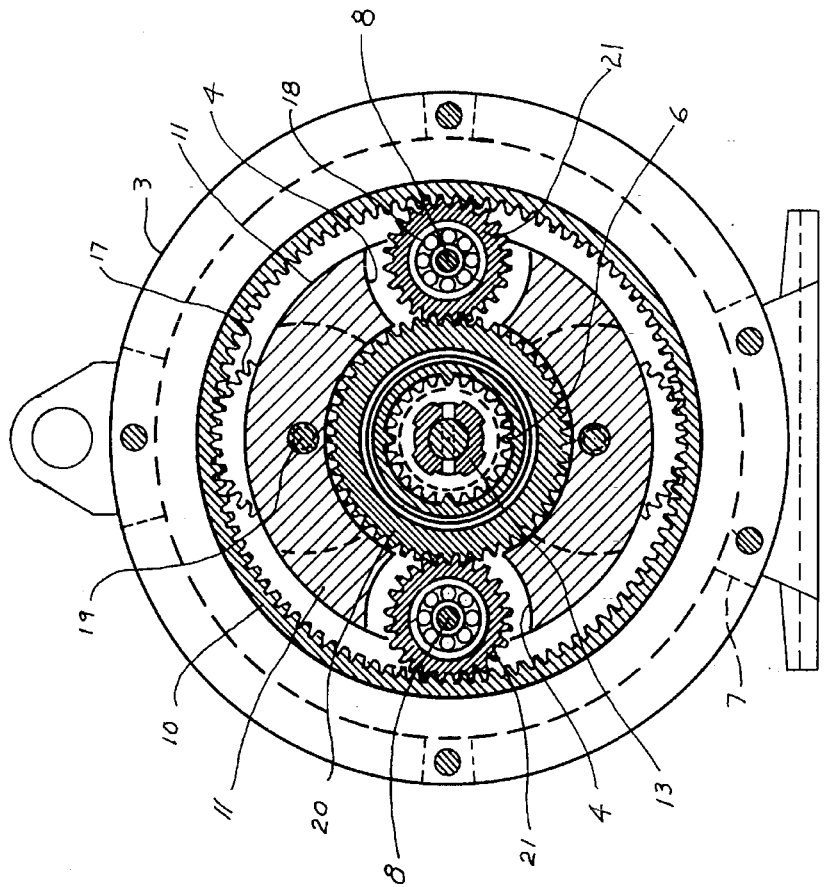
FIG. 3 is a view taken along the line 3—3 of FIG. 2.

Referring to FIG. 3, a pair of planet gears 21 are in constant mesh with the ring gear 10 and with the low speed sun gear 20. A bearing 18 is press fit in each of the planet gears 21. A shoulder on the outboard portion of a planet gear mounting pin 8 clamps the inner race of the bearing 18 and a washer 32 against an inboard wall of a pocket 4 in the planet gear carrier 11. The inboard end of the planet gear mounting pin 8 is threaded into an angle fitting (not shown) which fixes the axial position of the low speed sun gear 20 in the planet gear carrier 11. An internal tooth form 6 inside the bore of the sun gear 20 and a matching tooth form in the planet gear carrier 11 are arranged to mesh with the external teeth on the high speed sun gear 16 when it is moved axially into their planes, for torque transfer from the low speed sun gear 20 to the axle 13 for the middle speed, and from the planet planet gear carrier 11 to the axle 13 for direct drive.

Referring to FIG. 1 and FIG. 2, slotted openings in the bore of a crank 23 fit over axial projections 31 on the outboard end of the planet gear carrier 11 for torque transfer from the crank 23 to the planet gear carrier 11. The crank 23 is clamped on the end of the planet gear carrier 11 by a hollow hex headed screw 24.

Provisions for changing speeds include a shift rod 25 installed in a bored hole in the axle 13; a rod return spring 27; and a transverse pin 26 which extends through a hole in the end of the shift rod 25 out through slotted openings in the walls of the axle 13, and engages diametrically opposed holes in the hub of the high speed gear 16. A steel ball 28 is installed in each of a pair of diametrically opposed holes through the wall of the axle 13 and engages a conical groove in the shift rod 25. The conical shape on the inboard side of the groove provides an outward thrust on the steel balls 28 which is resisted by a ball retainer 29. A compression spring 30 holds the ball retainer 29 out against a snap ring installed in a groove in the end of the axle 13 so that a portion of the bore of the ball retainer 29 which is a close slip fit on the axle 13 is located over the balls 28. A conical transition section connects the close fit portion of the bore with a larger diameter portion of the bore in the ball retainer 29. When the ball retainer 29 is pushed inward against the force of the spring 30, the return spring 27 forces the steel balls 28 out into the larger diameter bore of the ball retainer 29 and the shift rod 25 slides outward until the high speed gear 16 engages the bearing 14 and steel the balls 28 trap the ball retainer 29 in its inboard position. If the shift rod 25 is then pushed in against the force of the spring 27, as soon as the inner conical groove in the shift rod 25 reaches the plane of the balls 28, the conical transition section in the ball retainer 29 under the force of the spring 30 pushes the balls into the conical groove in the shift rod 25 and the ball retainer 29 slides to its outboard position against the snap ring trapping the balls in the groove in the shift rod 25.

Figure 4:
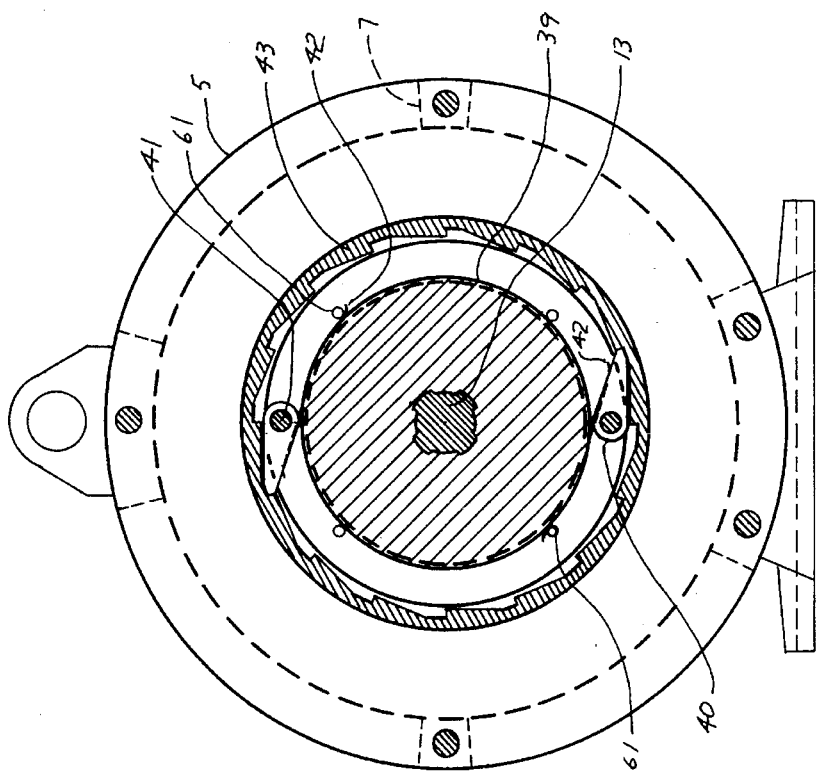
FIG. 4 is a view taken along the line 4—4 of FIG. 2.

The spool 9 is supported by a pair of bearings 33 which are seated on the axle 13. The inner race of the bearing 33 at the gear housing end of the spool, is seated against the inboard end of the spline providing torque transfer from the high speed gear 16 to the axle 13, and the outer race is seated against a shoulder in the spool 9. The outer race of the bearing 33 at the other end of the spool is held seated against a shoulder in the spool by a spring 34 installed between the inner race of the bearing 33 and a brake plate 37 which is axially slidable on a spline providing torque transfer from the axle 13 to the brake plate 37. Torque is transferred from the brake plate 37 to a drag washer 35 which is mounted on pins 36 press fit in the spool 9, by brake lining 38 which is bonded to the brake plate. Referring also to FIG. 4, a pair of pins 41 are welded to the brake plate 37 and extend outward through holes in a clutch plate 39. A pair of clutch dogs 40 are mounted on the pins 41 with each clutch dog forced out against a ratchet ring 43 by a light wire spring 42 installed in a circumferential groove in the clutch plate 39 and retained by a spring pin 61 press fit in the clutch plate. The clutch dogs 41 and ratchet ring 43 prevent the crank 23 from being driven backward.

With the clutch dogs 40 and ratchet ring 43 installed as shown in FIG. 4, the reel is set up for right handed fishermen with the gear housing and crank on the right side and the clutch on the left side when the reel is mounted on the fishing rod. If the ratchet ring 43 is press fit in the clutch housing 5 with its opposite face outboard, and the directions of the clutch dogs 43 and springs 42 are reversed. the reel is set up for left handed fisherman with the gear housing and crank on the left side when mounted on the fishing rod.

As shown in FIG. 2, a pair of belleville springs 54 are installed between the clutch plate 39 and the inner race of a bearing 15 seated on the axle 13. The outer race of the bearing 15 is a slip fit inside a drag lever mount 44 which is clamped in the clutch housing 5 by a nut 45 and rotationally fixed by integral internal projections in the clutch housing 5 engaging slots in an inboard flange of the drag lever mount 44. A drag adjustment screw 46 which is threaded into the drag lever mount 44 engages the outer race of the bearing 15. A pair of projections on a drive fitting 47 slide in diametrically opposed axial grooves in the drag adjustment screw 46. The drive fitting 47 is free to rotate but is held axially captive by an internal shoulder in the drag lever mount 44, and by a calibration disk 48 which is clamped on an integral square projection 60 on the drive fitting 47 by a bolt 49 threaded into the drive fitting 47.

Referring also to FIG. 5, a drag lever 50 is rotatably mounted on the drag lever mount 44 on the inboard side of the calibration disk 48. A pair of pins 55 are press fit in the drag lever 50 and engage a diametrically opposed pair of the holes closely spaced around the circumference of the calibration disk 48. A compression spring 52 located near the end of the drag lever 50 holds the drag lever firmly against the inboard side of the calibration disk 48, and holds a positioning pin 51 firmly against a strike ring 53 which is fastened with flush head screws joining the clutch housing 5 to the reel frame 7. As shown in FIG. 5, a single stop 57 limits clockwise rotation of the drag lever 50, with counterclockwise rotation limited by a strike alarm 63. Conical depressions in the strike plate 53 are positioned at three locations. The depression 56 indicates the normal location of the drag lever positioning positioning pin 51 for a freely spinning spool. The depression 58 is the location of the drag lever positioning pin 51 for the factory set drag. The depression 59 represents the location for 20% less, and the stop 57 for 20% more than the factory set drag.

Referring to FIG. 5 and FIG. 6, a strike alarm button 63 is mounted in a tangentially oriented depression in the strike ring 53. The strike alarm assembly consisting of the button 63, strike alarm pin 64, pin guide 69, compression spring 66, and cross pin 65, can be assembled on the strike ring prior to mounting the strike ring 53 on the clutch housing 5, by shoving the strike alarm pin 64 in until the hole for the cross pin is above the side wall of the strike alarm button 63, and installing the cross pin 65. The slot 67 through the base of the button 63 permits the button 63 to be moved from one end to the other end of the tangential depression in the strike ring 53. When the strike alarm button 63 is pushed to the lower end of the tangential depression in the strike ring 53, in the position shown, the cam surface 68 engages the cross pin 65 and lifts the strike alarm pin 64 clear of the drag washer 35, and clear of the equally spaced holes 62 around its perimeter, which excite the alarm when the button 63 is at the other end of the tangential depression.

The calibration disk selected to illustrate the improved means of drag control according to this invention uses 30 holes spaced at 12 degree intervals around the circumference of the calibration disk 48, with hole number 4 the hole used for the factory set drag.

The design developed to illustrate the improved three speed planetary drive according to this invention uses 32 pitch gears with 96 teeth on the ring gear 10; 24 teeth on the high speed sun gear 16; and 48 teeth on the low speed sun gear 20. The resulting three speeds are 5:1, 3:1, and 1:1.

While this invention has been described in terms of a preferred embodiment, it is anticipated that persons reading the preceding descriptions and studying the drawings will realize a number of possible modifications thereof. It is therefore intended that the following appended claims be interpreted as including all such modifications as fall within the true scope and spirit of the present invention.

I claim:

1. A fishing reel with a three speed planetary drive and means of drag control, said planetary drive comprising:

a planet gear carrier rotatably mounted in and axially restrained by a gear housing at one end of said reel;

a hand crank fastened to an outboard end of said planet gear carrier outboard of said gear housing for driving said planet gear carrier;

a ring gear mounted in said gear housing concentric with said planet gear carrier and restrained from rotating by said gear housing;

two pairs of planet gears rotatably mounted in said planet gear carrier with external teeth on each of said planet gears in constant mesh with internal teeth of said ring gear;

an axle with one end rotatably mounted in said gear housing at one end of said reel, and the other end rotatably mounted in a clutch housing at the other end of said reel, with said axle concentric with said ring gear and said planetary gear carrier;

a high speed sun gear rotatably fixed to but axially slidable on said axle, with said high speed sun gear in mesh with an inboard pair of said planet gears when located at an inboard end of its axial travel;

an intermediate sun gear rotatably mounted but axially fixed in said planet gear carrier, with external teeth on said intermediate sun gear in constant mesh with an outboard pair of said planet gears, and with internal teeth in a central bore of said intermediate sun gear in mesh with external teeth on said high speed sun gear when it is moved axially into the plane of said intermediate sun gear;

internal teeth in said planet gear carrier arranged to mesh with external teeth on said high speed sun gear when said high speed sun gear is located at the outboard end of its axial travel; and a means for moving said high speed sun gear to selected positions along said axle.

2. The fishing reel according to claim 1 wherein said high speed sun gear moving means includes:

a shift rod located in an axial hole in said axle;

a first compression spring located in said axial hole between an inboard end of said shift rod and an inboard end of said axial hole;

a transverse hole through the inboard end of said shift rod;

a diametrically opposed pair of axial slots through walls of said axle adjacent said transverse hole;

a transverse pin installed in said transverse hole in said shift rod, said transverse pin extending out through said axial slots and engaging diametrically opposed holes in a hub of said high speed sun gear;

a pair of steel balls located in diametrically opposed holes through the walls of said axle near its outboard end;

a cylindrical ball retainer slidably mounted on said axle over said steel balls;

an inside diameter of said ball retainer a close fit on said axle for a portion of the length of said ball retainer near its inboard end;

a larger inside diameter of said ball retainer for a portion of its length near its outboard end;

a conical transition section in said ball retainer between said close fit inside diameter portion and said larger inside diameter portion;

a second compression spring installed on an outside diameter of said ball retainer forcing said ball retainer out against a snap ring in an outboard end of said axle;

outboard and inboard conical grooves in said shift rod with said grooves located so that when said outboard conical groove lies in the plane of said steel balls, said high speed sun gear is in mesh with said inboard pair of planet gears, and when said inboard conical groove lies in the plane of said steel balls, said high speed sun gear is in mesh with said internal teeth in said intermediate sun gear, and when said inboard conical groove lies outboard of the plane of said steel balls, said high speed sun gear is in mesh with said internal teeth in said planet gear carrier.

3. The fishing reel according to claim 1 wherein said means of drag control includes a spool rotatably mounted but axially fixed on said axle;

a drag washer fastened on one end of said spool;

holes equally spaced around the perimeter of said drag washer for engagement with a strike alarm;

a brake plate torsionally fixed to but axially slidable on said axle;

brake lining fixed on an inboard side of said brake plate for engagement with said drag washer;

a clutch plate fixed on an outboard side of said brake plate concentric with said axle;

a pair of spring loaded dogs mounted on said clutch plate in engagement with a ratchet ring fixed inside said clutch housing;

a drag lever mount fixed inside said clutch housing with a portion of said drag lever mount extending outboard of said clutch housing;

a ball bearing with its inner race seated near the outboard end of said axle and its outer race slidably seated inside said drag lever mount;

a drag adjustment screw threaded inside said drag lever mount outboard of the outer race of said ball bearing;

axial grooves in a hole through the center of said drag adjustment screw;

a pair of belleville springs mounted on said axle between the inner race of said ball bearing and said clutch plate;

a drive fitting rotatably mounted but axially captive inside said drag lever mount;

local projections on said drive fitting engaging said axial grooves in said drag adjustment screw for rotating said drag adjustment screw;

a calibration disk fixed on an outboard end of said drive fitting outboard of said drag lever mount;

a drag lever rotatably mounted on said drag lever mount inboard of said calibration disk;

holes closely spaced around the perimeter of said calibration disk;

a pair of pins press fit in said drag lever for engagement with any diametrically opposed pair of said closely spaced holes in said calibration disk;

a strike ring fixed outboard said clutch housing concentric with said axle;

a positioning pin slidably mounted inside an inboard cylindrical extension of said drag lever;

a compression spring located inside said inboard cylindrical extension of said drag lever forcing said drag lever out against said calibration disk and forcing said drag lever positioning pin in against said strike ring;

a stop on said strike ring limiting clockwise rotation of said drag lever through engagement with said positioning pin;

a strike alarm button mounted on said strike ring limiting counterclockwise rotation of said drag lever;

a first conical depression in said strike ring to indicate free spool position of said drag lever;

a second conical depression in said strike ring to indicate the position of said drag lever for a specified drag; and a third conical depression in said strike ring to indicate the position of said drag lever for 20% less than a specified drag.

* * * * *